(12) United States Patent
Zuili et al.

(10) Patent No.: US 8,734,623 B1
(45) Date of Patent: May 27, 2014

(54) ON-DEMAND HYDROGEN GENERATOR

(75) Inventors: Patrick Zuili, Boca Raton, FL (US);
Daren Stabinski, Weston, FL (US);
Todd Stabinski, Miami, FL (US);
George Bitton, Boca Raton, FL (US)

(73) Assignee: Powerquest LLC, Weston, FL (US)

( * ) Notice: Subject to any disclaimer, the term of this patent is extended or adjusted under 35 U.S.C. 154(b) by 2 days.

(21) Appl. No.: 12/896,634

(22) Filed: Oct. 1, 2010

(51) Int. Cl.
*C25B 9/06* (2006.01)
*C25B 1/04* (2006.01)

(52) U.S. Cl.
USPC ......... 204/242; 204/275.1; 205/628; 205/637

(58) Field of Classification Search
USPC ..................... 204/242, 275.1; 205/628–639
See application file for complete search history.

(56) References Cited

U.S. PATENT DOCUMENTS 4,131,526 A * 12/1978 Moeglich ....................... 205/753
4,443,316 A *  4/1984 Struck .............................. 204/263
2003/0205482 A1 * 11/2003 Allen .............................. 205/630
2010/0200423 A1 *  8/2010 Miles .............................. 205/638
2010/0213076 A1 *  8/2010 McAlister ....................... 205/637

FOREIGN PATENT DOCUMENTS

EP            1724861 A1 * 11/2006
WO    WO 2010048533 A2 *  4/2010

* cited by examiner

*Primary Examiner* — Nicholas A Smith
(74) *Attorney, Agent, or Firm* — John R. Kasha; Kasha Law LLC

(57) ABSTRACT

Techniques for maintenance-free on-demand high-efficient hydrogen generation using a small amount of electricity are described. A piece of foam is provided in the fluid used to generate the hydrogen. The foam, similar to a sponge structure, includes a plurality of open cells to accommodate the fluid. In a sense, the foam has been made to have the maximum contact with the fluid. When applied on with an electrical power (current or voltage), the fluid causes electrolysis and pyrolysis to happen so as to generate hydrogen and oxygen (oxy-hydrogen). Depending on implementation, the electrical power is electronically pulsed electricity and helps drive the fluid in a container to vibrate at an electrical resonance of the container.

22 Claims, 1 Drawing Sheet

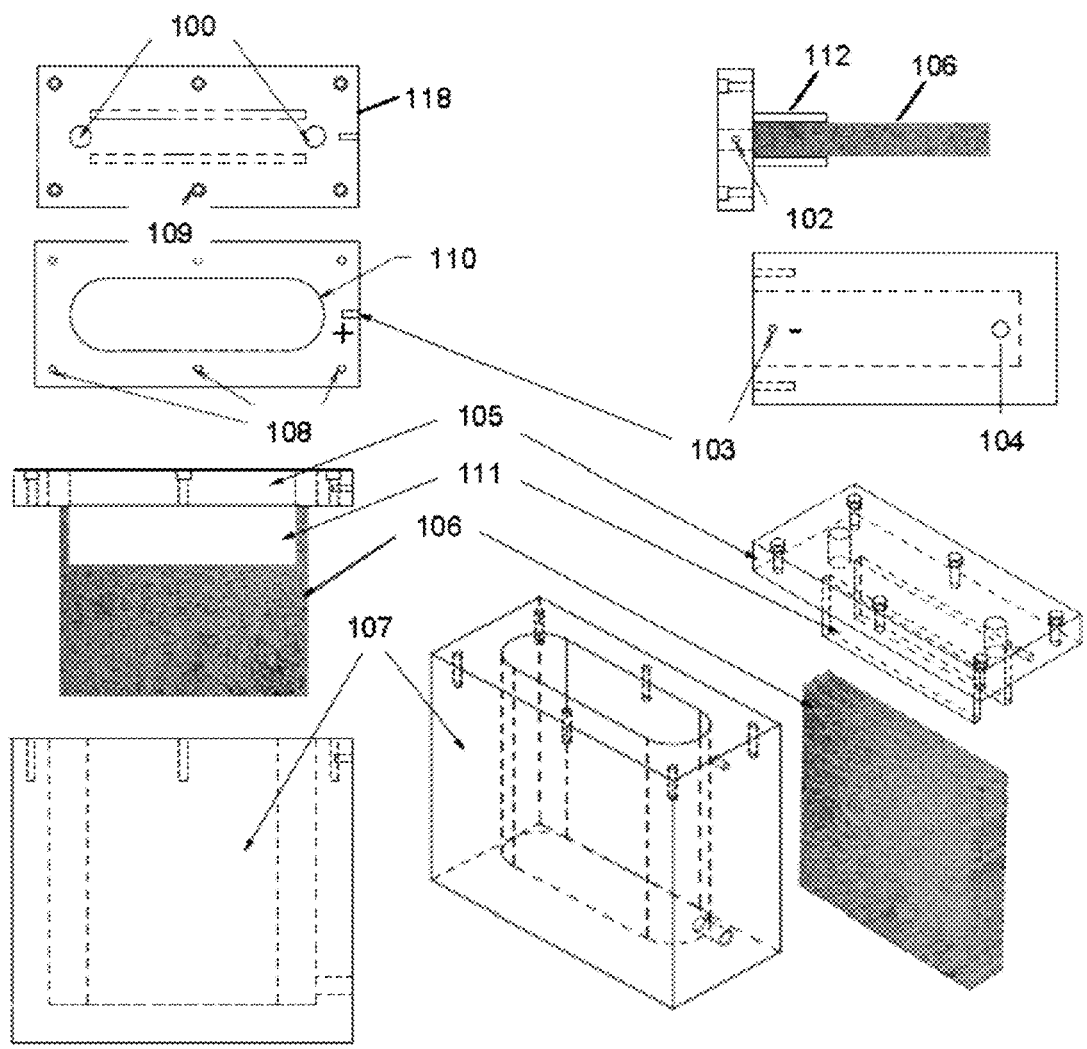

ON-DEMAND HYDROGEN GENERATOR

BACKGROUND OF THE INVENTION

1. Field of the Invention

The invention is generally related to the area of hydrogen generator. More particularly, the present invention is related to maintenance-free on-demand and high-efficient hydrogen and oxygen (oxy-hydrogen) generator using a small amount of electricity, where the oxy-hydrogen generated may be used as a source of energy to empower many types of machines running on combustion engines currently using fossil fuels or fuel cells.

2. The Background of Related Art

A hydrogen generator that creates hydrogen (H2) may come in many different varieties. One example is the hydrogen generator for automotive that creates hydrogen through either the electrolysis of water or reformation or extraction of another hydrogen-rich chemical. Some vehicles may use a hydrogen-rich chemical compound such as sodium borohydride, ammonia, methanol or even gasoline to generate the hydrogen by reformation or extraction. The resulting hydrogen will then be run through a fuel cell or internal combustion engine to power the vehicle.

There are a couple of types of hydrogen generators that use hydrogen to create electricity. One example of a small, portable hydrogen-powered generator for emergency use or for remote areas is where electricity is not readily available. A larger hydrogen-powered generator such as those produced by the Hydra Fuel Cell Corporation use the gas and a stationary fuel cell to create electricity for a home.

There is another kind of hydrogen generator that creates hydrogen, uses the gas to create power, and is often used in a power plant. It uses coal gasification to extract the hydrogen while sequestering the carbon dioxide (CO2). The carbon dioxide is then pumped underwater or underground such as in abandoned oil wells for permanent storage. The hydrogen is then used to run through a large turbine to create clean electricity.

As one can see, hydrogen releases energy when it is combined with oxygen, although a hydrogen generator needs to be defined by its function as well as whether it is powered by hydrogen or creates the gas to generate power or for another use. One thing is for certain that hydrogen is a versatile element that can provide clean power.

Hydrogen, however, does not come free or occur naturally in practice. Production of hydrogen from water often requires more energy than it can produce for actual use as energy. Efficiency of generating hydrogen from free or low-cost material such as water has been long sought.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to maintenance-free on-demand high-efficient hydrogen generator using a small amount of electricity. According to one aspect of the present invention, a piece of graphite foam is provided in the fluid used to generate the hydrogen. The graphite foam, similar to a sponge structure, includes a plurality of open cells to accommodate the fluid. In a sense, the graphite foam has been made to have the maximum contact with the fluid. When applied on with an electrical power (current or voltage), the fluid causes electrolysis and pyrolysis to happen so as to generate hydrogen and oxygen (oxy-hydrogen). Depending on implementation, the electrical power is electronically pulsed electricity and helps drive the fluid in a container to vibrate at an electrical resonance of the container.

There are numerous functions, benefits and advantages in the present invention, one of them is that the present invention provides new structures to efficiently generate hydrogen from a type of fluid (e.g., water). The present invention may be implemented in numerous forms. According to one embodiment of the present invention, the present invention is a hydrogen generating mechanism comprising: a graphite container to accommodate a fixed amount of fluid, a graphite foam disposed in the container and soaked in the fluid, where the graphite foam provides a maximized surface in contact with the fluid, and a top lid in electrical contact with the graphite foam and the foam acting as an electrode and the container acting as the other electrode. Both electrodes are being applied with an amount of electrical power to cause electrolysis and pyrolysis to produce hydrogen and oxygen (oxy-hydrogen). To make the fluid reacting more to the power, the fluid contains a certain amount of electrolyte.

According to another embodiment of the present invention, the present invention is a method for generating hydrogen, the method comprises: providing a container acting as a first electrode and to accommodate a fixed amount of fluid, disposing a foam in the container, connected to a top lid, wherein the foam is substantially soaked in the fluid, the foam provides a maximized surface in contact with the fluid; and acts as second electrodes to cause electrolysis and pyrolysis to produce hydrogen and oxygen (oxy-hydrogen). Depending on implementation, the foam is made of a highly conductive material (e.g., graphite). The foam, similar to a sponge-like structure, includes a plurality of open cell structures (e.g., holes).

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1 shows a cooling unit that may be used in one embodiment of the present invention.

DETAILED DESCRIPTION OF THE PREFERRED EMBODIMENTS

The detailed description of the present invention is presented largely in terms of procedures, steps, logic blocks, processing, or other symbolic representations. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Referring now to the drawings, in which like numerals refer to like parts throughout the several views. FIG. 1 shows several break-down views of a hydrogen generating cell according to one embodiment of the present invention. Depending on implementation and desired hydrogen volume, there could be one or more cells in a hydrogen generator. As will be further described below, the volume of the hydrogen generated from one cell is controllable by the amount of electricity provided. According to one embodiment, the electricity can be solar using photovoltaic panels. According to another embodiment, the hydrogen generated from one or more cells is collected in a sealed container as storage.

A hydrogen generating cell as shown in FIG. 1 comprises a cell box or container 107 to accommodate a piece of highly-conductive foam 106 soaked in a type of fluid therein. In one embodiment, a holding structure 112 is provided to hold up the foam 106 to the container 107. The container 107 is optionally protected externally with a layer of alumina or a layer of highly temperature resistant epoxy or any other method to close the pores of the container. The foam 106 is made out a highly conductive material to maximize the surface contact with the fluid. An example of the highly conductive material is graphite. In one embodiment, the foam 106, similar to a sponge-like structure, is made out of graphite with open cells or holes measured for example between 10-100 PPI (pores per inch) in size. When substantially soaked or immersed in the fluid, the foam 106 has essentially maximized its surface contact with the fluid.

The foam 106 is disposed in the container 107 but without physical contact with the container 107. In one embodiment, the foam 106 is held up by a pair of brackets 112 sandwiching the foam 106. Regarding the fluid being used, there may be a few types, examples of the fluid include, may not be limited to, water, salty water and ammonia. To make the fluid more productive in generating the hydrogen, a certain amount of electrolyte is added to the fluid, where the electrolyte is any substance containing free ions that behave as an electrically conductive medium. Because they generally consist of ions in solution, electrolytes are also known as ionic solutions. In operation, a certain amount of electrolyte is delivered into the container 107, for example, by gravity or a pump.

The container 107 is enclosed with a lid 118, where there is at least one opening 100 to release or transfer the hydrogen being generated in the container 107 to storage (not shown). FIG. 1 shows that there are two openings 100 to quickly release the pressure and the hydrogen generated in the container 107 to the storage. In one embodiment, the lid 118 becomes part of the container 107 by screws 108. The screws 108 are made out of a ceramic material (not electrically conductive material). To prevent any possible gas leakage, a gasket (not shown) around the lid 1180 is used, where the gasket is made out of a type of material that is temperature and electrically insulated.

According to one embodiment, the container 107 may be enclosed by a layer of steel or alumina or any other material resistant to pressure with a high level of closed pores to prevent any leaks of the hydrogen being generated in the container 107, where in between the container 107 and the enclosure a type of liquid is pumped in and out to cool down the container 107, if needed. According to one embodiment, the container 107 is filled in with a pre-measured amount of fluid mixed with the electrolyte through an opening 104, and refilled when the amount of fluid is below a predetermined level.

In operation, a low current low amp is applied across two electrodes 102 and 103 that are disposed across the foam 106. The current from the two electrodes 102 and 103, also referred to as anode connector and cathode connector, causes the fluid in contact with the foam to provide a high amount of electrolysis and pyrolysis, thus the hydrogen and oxygen (oxy-hydrogen) are generated and travel out the opening(s) 101 to the storage, for example, through a tube.

In one embodiment, the current or voltage used is electronically pulsed electricity. Such electricity helps drive the fluid in the container 107 to vibrate at the electrical resonance (frequency) of the container 107 with or without electrolyte. According to one embodiment, the power is applied outside the container 107 with a positive electrode on the lid 118 and a negative electrode near the bottom of the container 107. A certain amount of electrolyte may be delivered from outside the box by gravity or using a pump, if needed.

In order to provide a highly combustible gas directed through a bubbler, a flashback arrestor is used to prevent any hydrogen explosion due to the high speed burning process of the hydrogen inside an engine (combustion chamber). In operation, the amount of hydrogen produced is proportional to the size of the container 107 as well as the amperage and/or voltage. The container 107 can be used by directly connecting to a 12V battery, an alternator, or an ac/dc power source in order to start a water molecular break-down process to generate the hydrogen. In one embodiment, an electrical pulse generator is used, in which case the electrolyte may not be necessary.

The container 107 by itself can provide on-demand hydrogen in order to minimize any storage of highly flammable and prevent possible explosion. After burning the hydrogen inside a combustion engine, the residue at the exhaust is water. The water can be reused by adding some electrolyte and recycled back to the container 107 to form a closed operational loop.

The mechanism or method for efficiently generating hydrogen described herein has many applications beyond what is discussed herein. One of the key features, advantages, and benefits in the present invention is the use of foam to maximize its surface contact with the fluid to generate hydrogen in a controllable amount. Multiple of the mechanism could be used to increase the production of the hydrogen for the demand of more energy therefrom.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:
1. A hydrogen generating mechanism comprising:
   a container to accommodate a fixed amount of fluid, wherein the container is made of graphite;
   a lid for the container;
   a foam disposed in the container and soaked in the fluid, where the foam provides a maximized surface in contact with the fluid, wherein the lid is in electrical contact with the foam; and
   wherein the foam and the container are electrically insulated from each other, act as a pair of electrodes, and are applied with an amount of electrical power to cause electrolysis and pyrolysis to produce hydrogen and oxygen (oxy-hydrogen.

2. The hydrogen generating mechanism as recited in claim 1, wherein the fluid contains a certain amount of electrolyte.

3. The hydrogen generating mechanism as recited in claim 2, wherein the fluid is replenished when the amount of the fluid in the container is below a predefined level.

4. The hydrogen generating mechanism as recited in claim 2, wherein the fluid is delivered into the container by gravity or a pump.

5. The hydrogen generating mechanism as recited in claim 2, wherein the electrolyte is delivered into the container by gravity or a pump.

6. The hydrogen generating mechanism as recited in claim 1, wherein the electrical power is electronically pulsed electricity and helps drive the fluid in the container to vibrate at an electrical resonance of the container.

7. The hydrogen generating mechanism as recited in claim 1, wherein the foam is made of a highly conductive material.

8. The hydrogen generating mechanism as recited in claim 7, wherein the foam, similar to a sponge-like structure, includes a plurality of open holes.

9. The hydrogen generating mechanism as recited in claim 7, wherein the highly conductive material is made out of graphite.

10. The hydrogen generating mechanism as recited in claim 1, further including a mechanism to recycle used fluid from burning the hydrogen inside a combustion engine.

11. The hydrogen generating mechanism as recited in claim 1, further including a mechanism to recycle used fluid from using the hydrogen inside a fuel cell to recover electricity from the hydrogen.

12. The hydrogen generating mechanism as recited in claim 1, wherein the electrical power is provided from one or more solar photovoltaic panels.

13. A method for generating hydrogen, the method comprising:

providing a graphite container to accommodate a fixed amount of fluid, wherein the graphite container includes a graphite lid;

disposing a foam in the graphite container, wherein the foam is substantially soaked in the fluid, the foam provides a maximized surface in contact with the fluid, wherein the graphite lid is in electrical contact with the foam, and wherein the graphite container and the foam are electrically insulated from each other and act as a pair of electrodes; and applying a power source across the electrodes to cause electrolysis and pyrolysis to produce hydrogen and oxygen (oxy-hydrogen).

14. The method as recited in claim 13, wherein the fluid contains a certain amount of electrolyte.

15. The method as recited in claim 13, wherein the container is completely made of graphite.

16. The method as recited in claim 14, wherein the fluid is replenished when the amount of the fluid in the graphite container is below a predefined level.

17. The method as recited in claim 14, wherein the fluid is delivered into the graphite container by gravity or a pump.

18. The method as recited in claim 14, wherein the electrolyte is delivered into the graphite container by gravity or a pump.

19. The method as recited in claim 13, wherein the electrical power is electronically pulsed electricity, and the method further comprising: driving the fluid in the graphite container to vibrate at an electrical resonance of the graphite container.

20. The method as recited in claim 13, wherein the foam, similar to a sponge-like structure and made of a highly conductive material, includes a plurality of open holes.

21. The method as recited in claim 20, wherein the highly conductive material is made out of graphite.

22. The method as recited in claim 13, further including a mechanism to recycle used fluid from burning the hydrogen inside a combustion engine.

* * * * *